US009084390B2

(12) United States Patent
Audigie et al.

(10) Patent No.: US 9,084,390 B2
(45) Date of Patent: Jul. 21, 2015

(54) AGRICULTURAL MACHINE WITH AN IMPROVED TERRAIN FOLLOWING FOR THE WORK ELEMENTS

(71) Applicant: KUHN S.A., Saverne (FR)

(72) Inventors: Jean-Charles Audigie, Bouxwiller (FR); Cedric Laplanche, Saverne (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/362,785

(22) PCT Filed: Dec. 18, 2012

(86) PCT No.: PCT/FR2012/052962
§ 371 (c)(1),
(2) Date: Jun. 4, 2014

(87) PCT Pub. No.: WO2013/093318
PCT Pub. Date: Jun. 27, 2013

(65) Prior Publication Data
US 2014/0311391 A1    Oct. 23, 2014

(30) Foreign Application Priority Data

Dec. 21, 2011 (FR) ...................... 11 62116

(51) Int. Cl.
A01B 7/00      (2006.01)
A01B 15/14     (2006.01)
A01B 63/22     (2006.01)
A01C 7/08      (2006.01)
A01C 7/20      (2006.01)
A01C 7/00      (2006.01)

(52) U.S. Cl.
CPC . A01C 7/00 (2013.01); A01B 15/14 (2013.01); A01B 63/22 (2013.01); A01C 7/08 (2013.01); A01C 7/081 (2013.01); A01C 7/201 (2013.01); A01C 7/208 (2013.01)

(58) Field of Classification Search
CPC .............. A01C 7/08; A01C 7/00; A01C 7/20; A01C 7/201; A01C 7/208; A01C 7/081; A01B 15/14; A01B 15/00; A01B 63/22; A01B 63/16; A01B 63/14; A01B 63/00
See application file for complete search history.

(56) References Cited

U.S. PATENT DOCUMENTS 7,640,877 B1    1/2010 Memory
2010/0122648 A1 5/2010 Memory

FOREIGN PATENT DOCUMENTS

FR    2 909 514    6/2008

OTHER PUBLICATIONS

International Search Report issued Mar. 11, 2013, in PCT/FR12/052962 filed Dec. 18, 2012.
U.S. Appl. No. 14/403,843, filed Nov. 25, 2014, Audigie, et al.
U.S. Appl. No. 14/402,992, filed Nov. 21, 2014, Audigie.

Primary Examiner — Christopher J Novosad
(74) Attorney, Agent, or Firm — Oblon, McClelland, Maier & Neustadt, L.L.P.

(57) ABSTRACT

An agricultural machine for working soil or for sowing seeds, including a trailed chassis and work elements distributed on a longitudinal bar in plural sections, the longitudinal bar including at least two primary beams extending substantially transversely to a direction of advance in a work configuration. A secondary beam is connected to each primary beam by two connection devices, the secondary beams support the work elements, and each secondary beam rests on the soil by two support wheels and is configured to move freely during work to follow a profile of the terrain.

10 Claims, 3 Drawing Sheets

AGRICULTURAL MACHINE WITH AN IMPROVED TERRAIN FOLLOWING FOR THE WORK ELEMENTS

BACKGROUND

The present invention relates to the general technical field of agricultural machinery. The invention concerns an agricultural machine for working the soil or for sowing seeds, with a trailed chassis and work elements distributed on a longitudinal bar in several sections, the longitudinal bar has at least two primary beams extending substantially transversely to the direction of advance in a work configuration.

In the case of a seeding machine or a seeder, the work elements rest on the ground with a predetermined pressure or must work the soil at a specified depth to ensure a good germination of the seeds and a homogeneous emergence of the plants. In the case of a machine for working the soil or for preparing a seedbed, the work elements, in the form of teeth or discs, must work at a specified work depth.

Such a machine for sowing seeds is represented in the document U.S. Pat. No. 8,001,914 B2. This agricultural machine has a trailed chassis with a longitudinal bar in two sections. The longitudinal bar thus has two primary beams carrying work elements. This is a single seeder having a large width, the work elements of which deposit the seeds at a specified depth in furrows. Each primary beam is directed transversely to the direction of advance and is connected to the chassis via an articulation having an axis which is substantially horizontal and parallel to the direction of advance. The free end of the primary beam rests on the soil via a support wheel. Each section pivots upwards or downwards about the articulation having a horizontal axis according to the surface traced by the support wheel situated at the end. Thus, only the work elements situated directly in the vicinity of the support wheel will have a precise position with respect to the soil observing the desired work depth. The other work elements, more distant from the support wheel, will follow the undulations of the terrain more roughly, and the planting depth of the seeds will not be homogeneous over the entire length of the primary beam. It is noted, moreover, that the support wheel extends at the front of the primary beam, whereas the work elements are arranged at the rear. This distance between the support wheel and the work elements, taking into account the direction of advance, also causes a loss of precision for the work elements with regard to their following of the terrain. The same applies for the work elements arranged towards the centre, since the wheels carrying out the control of the depth are remote from the work elements, because they are fastened at the rear of the chassis.

BRIEF SUMMARY

The present invention has the aim of overcoming the above-mentioned drawbacks and aims to propose an agricultural machine with a better adaptation to the soil for the work elements.

According to the invention, the agricultural machine is characterized in that a secondary beam is connected to each primary beam by means of two connection devices, the secondary beam support the work elements, and that each secondary beam rests on the soil by means of two support wheels and is able to move freely during work to follow the profile of the terrain. Owing to these features, each second beam with its work elements can faithfully follow the undulations of the terrain. The freedom of movement of the connection devices thus enables the work elements to carry out a work at a specified depth over the entire length of the secondary beam. Each secondary beam is therefore able to follow with precision the undulations of the terrain and to fit the profile. The position of the secondary beam in space is independent of that of the chassis. During work, the secondary beam extends substantially parallel to the surface of the soil.

BRIEF DESCRIPTION OF THE DRAWINGS

Other features and advantages of the invention will emerge from the following description with regard to the attached drawings which are given only by way of non-restrictive examples of the invention. In these drawings.

DETAILED DESCRIPTION

Figure 1:
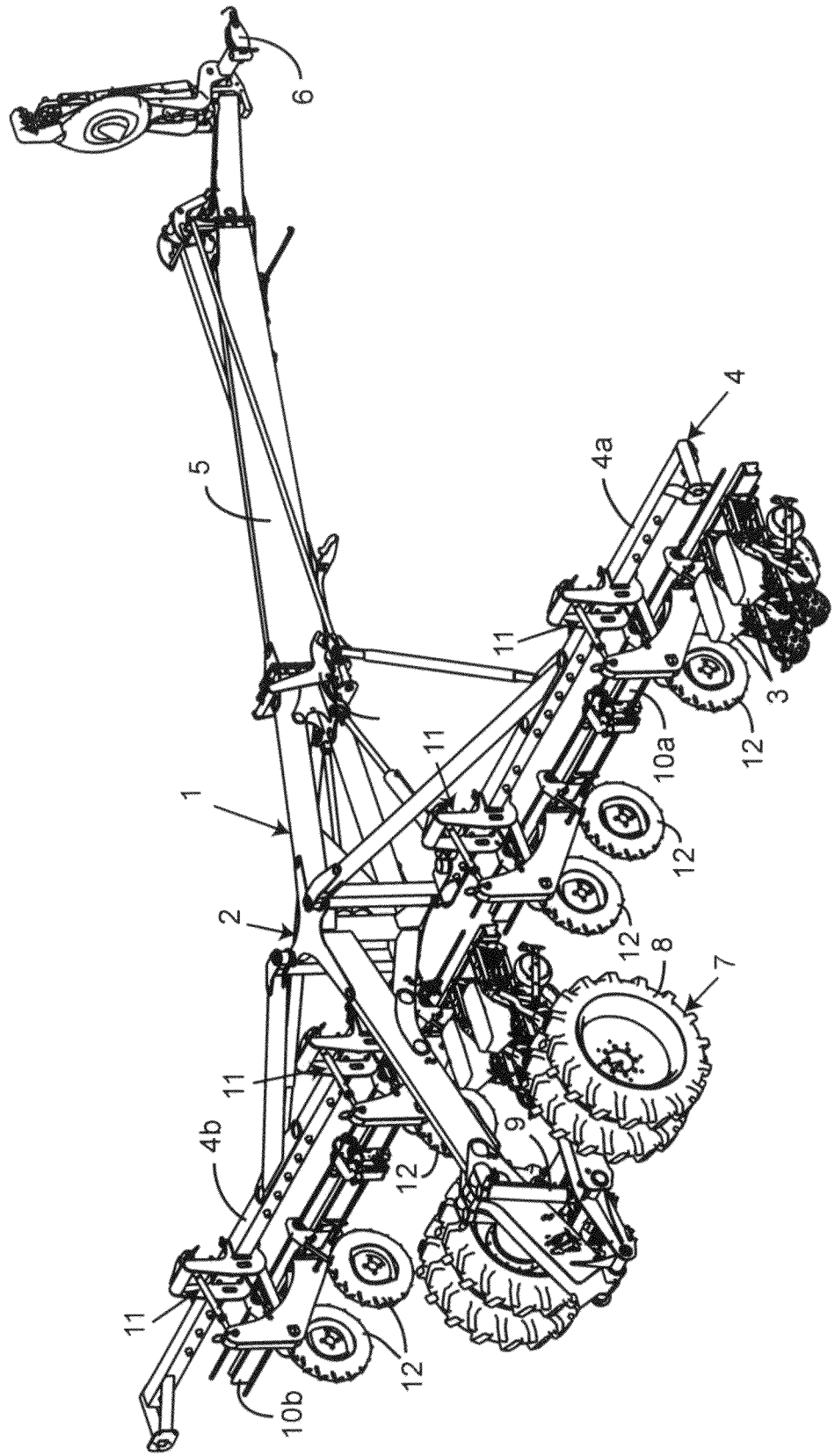
FIG. 1 is a perspective view of an agricultural machine according to the invention, in a work configuration.

The agricultural machine (1) for working the soil or for sowing seeds according to the invention comprises a trailed chassis (2) and work elements (3) distributed over a longitudinal bar (4) in several sections, which enables the agricultural machine (1) to act over a wide working strip. The longitudinal bar (4) has at least two primary beams (4a, 4b). The primary beams (4a, 4b) extend substantially transversely to the direction of advance (A) in a work configuration. The primary beams (4a, 4b) extend in the extent of one another, they are substantially aligned, taking into account the direction of advance (A).

The chassis (2) is made in the form of a longitudinal frame (5) equipped at the front with a hitching system (6) intended to be hitched to the hitching device of a tractor (not shown) and at the rear with a carriage (7). The tractor is brought to move and to drive the agricultural machine (1) along a direction of advance indicated by the arrow (A). The invention thus concerns a trailed agricultural machine, the chassis (2) of which rests on the soil via the wheels (8) of the carriage (7). So as to adapt to the different work which is to be carried out, the height of the chassis (2) is adjustable with respect to the carriage (7) by means of at least one actuator (9). In the example shown, the actuator (9) is carried out in the form of a jack, composed of a cylinder and of a piston, which moves in one direction or the other under the action of a fluid. The actuator (9) is preferably a jack of the double-acting type. Advantageously, two actuators (9) extend between the carriage (7) and the chassis (2). These actuators (9) have the function of raising or lowering the chassis (2) of the agricultural machine (1).

According to an important feature of the invention, the agricultural machine (1) comprises a secondary beam (10a, 10b) connected to each primary beam (4a, 4b) by means of two connection devices (11), the secondary beams (10a, 10b) support the work elements (3) and each secondary beam (10a, 10b) rests on the soil by means of two support wheels (12) and is able to move freely during work to follow the profile of the terrain. In this way, all the work elements (3) can faithfully follow the undulations of the terrain and can thus ensure a uniform work depth over the entire length of the secondary beam (10a, 10b). The freedom of movement of the connection devices (11) allows the secondary beam (10a, 10b) to follow with precision the undulations of the terrain and to fit the profile of the soil during work. The secondary beam (10a, 10b) adapts itself and follows the soil perfectly during work, its position is substantially parallel to the surface of the soil. Its position in space is independent of that of the longitudinal bar (4) and particularly of the corresponding primary beam (4a, 4b). Preferably, each secondary beam (10a, 10b) is substantially parallel to the corresponding primary beam (4a, 4b).

According to another feature, a connection device (11) is arranged substantially in the vicinity of each end of secondary beam (10a, 10b). A connection device (11) extends on either side of the median plane of the secondary beam (10a, 10b). Preferably, at least one support wheel (12) is associated with each connection device (11). Thus, each secondary beam (10a, 10b) rests on the soil with at least two support wheels (12). Each support wheel (12) has, on one hand, the function of resting on the soil and of following the terrain, and, on another hand, of ensuring the function of regulating the work depth for the work elements (3). The work elements (3) are fastened on the secondary beams (10a, 10b) in a regular manner with constant spacings. They are distributed symmetrically with respect to the median vertical plane of the agricultural machine (1).

Advantageously, a support wheel (12) is arranged in the vicinity of each end of secondary beam (10a, 10b). This position of the support wheels (12) towards the ends of secondary beam (10a, 10b) provides stability. The support wheel (12) is preferably arranged between a connection device (11) and the end of the closest secondary beam (10a, 10b). The support wheels (12) extend on either side of the two connection devices (11). With support points or support surfaces on the soil achieved by the spaced apart support wheels (12), the following of the terrain and hence the orientation of the secondary beam (10a, 10b) is more faithful to the undulations of the terrain. Preferably, the support wheels (12) are distant from the median vertical plane of the respective secondary beam (10a, 10b).

FIG. 1 represents an agricultural machine (1) according to the invention in a work configuration with solely two work elements (3). The work elements (3) are fastened at the rear of the secondary beams (10a, 10b). The primary beams (4a, 4b) and the secondary beams (10a, 10b) extend transversely to the direction of advance (A). The two secondary beams (10a, 10b) are arranged in an aligned manner with respect to one another, taking into account the direction of advance (A). In an alternative, which is not shown, the secondary beams (10a, 10b) are arranged in an offset manner in the direction of advance (A). The agricultural machine (1) represented in FIG. 1 is a machine for sowing seeds. The description which follows will relate to a precision seeder or single seeder. The work elements (3) are elements intended to distribute the seeds one by one and to plant them in a seed row with constant spacings. The work element (3) is thus a seeder element having a hopper, a distribution arrangement, elements for burying and for depth control. The seeder element can also comprise elements for tamping and/or for covering. The mounting of the seeder element on the longitudinal bar is carried out with a deformable parallelogram which enables it to move parallel to the soil in order to adapt itself individually to the bumps and hollows of the soil. In the case of a seeder having a central hopper, the seeder element will not have a hopper. In the case of a seed drill, the seeder element will not have a hopper or individual distribution arrangement.

In the light of FIG. 1, it is to be noted that two support wheels (12) are associated with a connection device (11). Thus, each secondary beam (10a, 10b) rests on the soil via four support wheels (12). One support wheel (12) extends on either side of each connection device (11). The use of several support wheels (12) allows a better bearing capacity and a finer following of the terrain.

Figure 2:
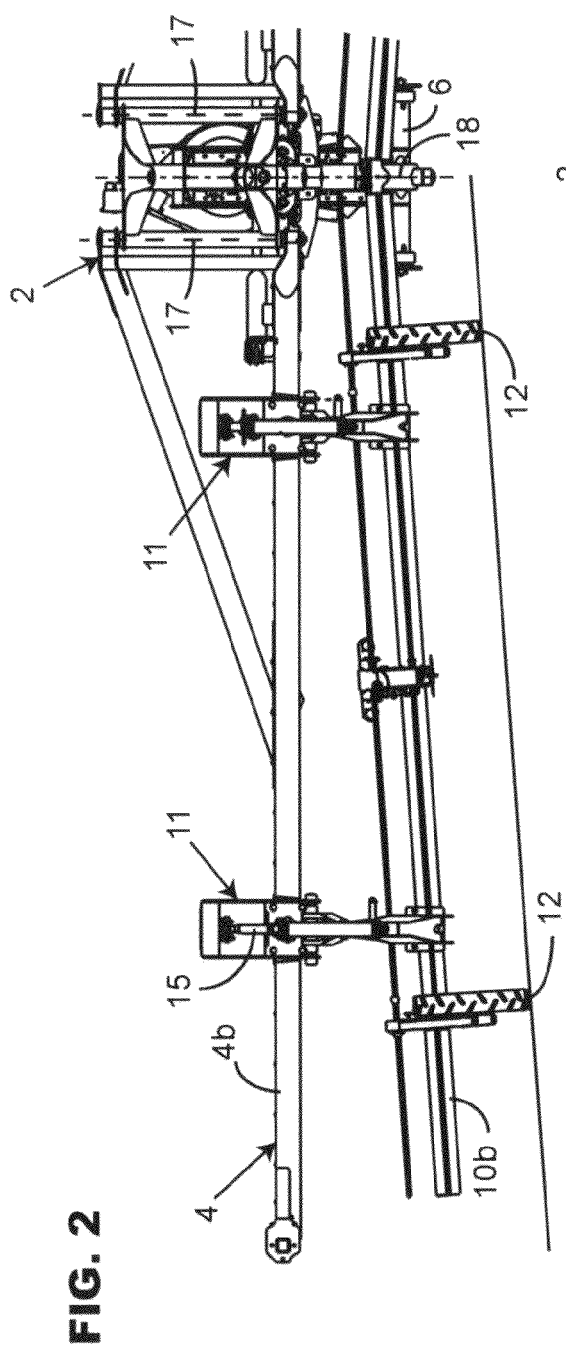
FIG. 2 is a rear view of a bar section of the agricultural machine during work on a terrain with a left slope.
Figure 3:
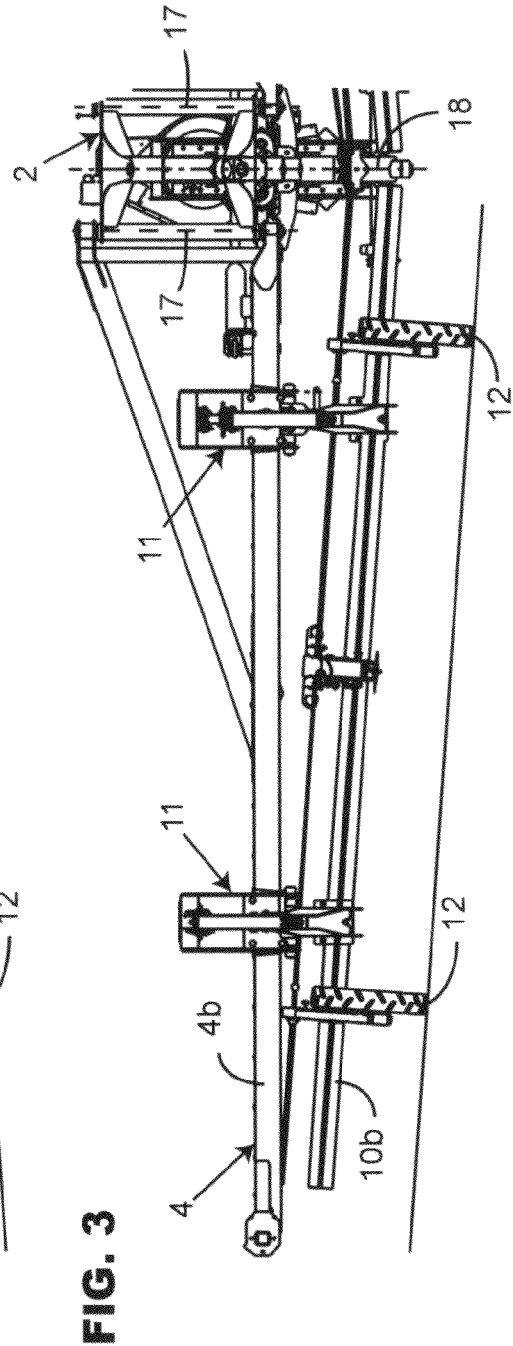
FIG. 3 is a rear view of a bar section of the agricultural machine during work on a terrain with a right slope.

FIGS. 2 and 3 represent, according to a rear view, the left-hand part of the agricultural machine (1) in a work configuration on a sloping terrain. The work elements (3) have not been represented in these figures. The inclination of the terrain of FIG. 2 is sloping to the left, whereas the inclination of the terrain of FIG. 3 is sloping to the right. The representation of FIGS. 2 and 3 shows, inter alia, the left-hand primary beam (4b) and the left-hand secondary beam (10b). In this example embodiment, the secondary beam (10b) rests on the soil solely by means of two support wheels (12). An interior support wheel which extends close to the median plane (18) of the agricultural machine (1) and an exterior support wheel which extends towards the opposite end. It can be noted in these figures that the freedom of movement of the connection devices (11) enables the work elements (3) and the secondary beam (10b) to follow with precision the undulations of the terrain during work. The right-hand part of the agricultural machine (1) is advantageously symmetrical to the left-hand part.

Particularly advantageously, the position of the connection devices (11) of a secondary beam (10a, 10b) is independent, because each connection device (11) is floating during work. The secondary beams (10a, 10b) are therefore not forced to keep the same inclination or position as the corresponding primary beam (4a, 4b). Each end of secondary beam (10a, 10b) benefits from a freedom of movement upwards or downwards and transversely to follow the profile of the soil. This mobility allows a faithful and precise following of the terrain. The advancing force of the chassis (2) and in particular of the primary beam (4a, 4b) is transmitted to the secondary beam (10a, 10b) via its connection through the connection devices (11).

In FIGS. 2 and 3, it is noted that the secondary beam (10b) is inclined, whereas the primary beam (4b) is substantially horizontal. The connection devices (11) are represented in two extreme positions: an upper position and a lower position. The connection device (11) close to the median vertical plane (18) of the agricultural machine (1) of FIG. 2 extends in an upper position and the other extends in a lower position. Owing to the connection devices (11), each secondary beam (10a, 10b) has a relatively high amplitude of movement, in the order of 8° upwards and 8° downwards. The position of the connection devices (11) of FIG. 3 is reversed with respect to that of FIG. 2. During work, the secondary beam (10b) will be able to take all the possible inclinations as long as they remain in the range between the upper position and the lower position of the connection devices (11). The centre of rotation of each secondary beam (10a, 10b) extends between its two connection devices (11). In the embodiment which is represented, the connection devices (11) extend advantageously, at each end, in the part forming the third of the length of the secondary beam (10a, 10b).

Figure 4:
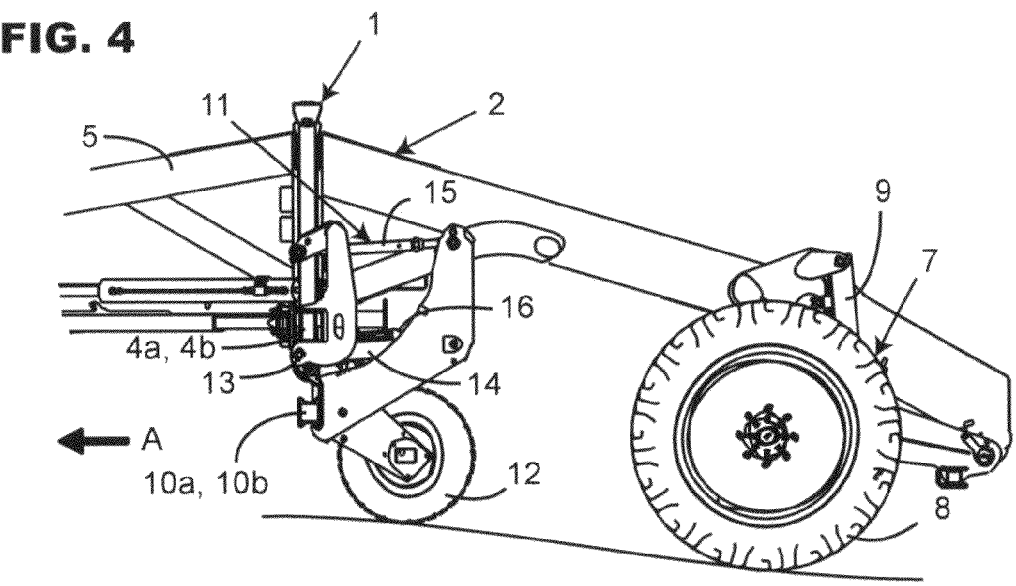
FIG. 4 represents a side view in a work position.
Figure 5:
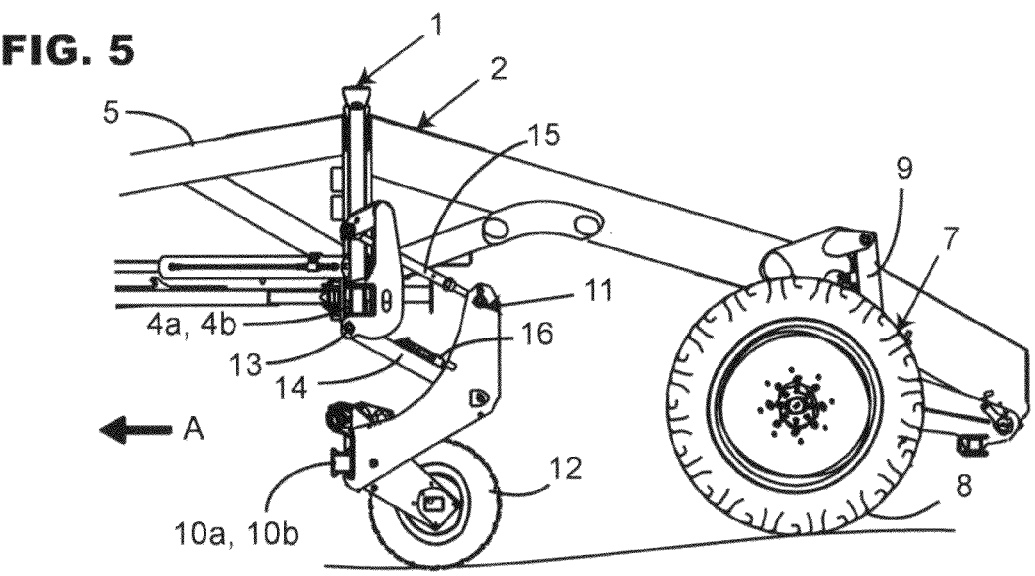
FIG. 5 represents a side view in another work position.

FIGS. 4 and 5 illustrate a side view of the rear part of an agricultural machine (1) according to the invention in a work configuration. FIG. 4 represents a connection device (11) in an upper position and FIG. 5 represents a connection device (11) in a lower position. The work elements (3) are not represented in these figures. Advantageously, the part of the secondary beam (10a, 10b) contained in the vertical plane passing through the connection device (11) is able to move according to a planar movement. This movement is carried out with respect to the corresponding primary beam (4a, 4b) owing to the connection devices (11). Such a movement enables the work elements (3) to remain substantially parallel to the surface of the soil. The secondary beam (10a, 10b) extends substantially beneath the primary beam (4a, 4b) such that the secondary beams (10a, 10b) are closer to the soil than the primary beams (4a, 4b).

Advantageously, each connection (11) has four articulations, one of which is a pivot articulation (13) having an axis which is horizontal and perpendicular to the direction of advance (A). These four articulations together form substantially a quadrilateral. The quadrilateral is preferably a parallelogram allowing a displacement which is vertical and substantially parallel to the soil to the secondary beam (10a, 10b). The connection device (11) comprises at least one lower connecting-rod (14) and at least one upper connecting-rod (15). The pivot articulation (13) connects the primary beam (4a, 4b) to one of the ends of the lower connecting-rod (14). The other end of the lower connecting-rod (14) is connected to the secondary beam (10a, 10b) via a ring-shaped linear articulation. Each upper connecting-rod (15) has at its ends an articulation of the spherical type connecting, on one hand, the primary beam (4a, 4b) and on another hand the secondary beam (10a, 10b). Owing to these different articulations, the mobility of each secondary beam (10a, 10b) enables the work elements (3) to adapt to the soil in an optimum manner.

The following of the terrain by the work elements (3) is conditioned by the proximity between the support points and the work elements (3). It is therefore advantageous that the support wheels (12) are situated close to the work elements (3) so that the work depth of the work elements (3) is substantially identical over the entire length of the secondary beam (10a, 10b). Preferably, the support wheels (12) are substantially aligned with the work elements (3) in top view, taking into account the direction of advance (A). Thus, the support wheels (12) extend between the work elements (3). In the case of a seeder, the surface for support on the soil of the support wheels (12) is substantially aligned with the burying elements. Given that the work elements (3) are juxtaposed to the support wheels (12), their following of the terrain is considerably improved. In an alternative, the support wheels (12) can be positioned in front of the secondary beams (10a, 10b).

Each connection device (11) has a stop system (16) making the limiting of the travel downwards possible and in particular allowing to control the maximum work depth. In the case of elements intended to plant a product in the soil, it is thus prevented that the elements penetrate too deeply into the soil when the soil is loose. The lower stop will be adjustable with regard to the work which is to be carried out. During transport and half turns at the end of the field, provision is made to activate the stop system (16) to release the work elements (3) from the soil. This enables the agricultural machine (1) to carry out the manoeuvres with an increased ground clearance without damaging the work elements (3).

In order to comply with transport legislation for traffic on the roads, the large working width of the agricultural machine (1) must be reduced during transport. Therefore, the primary beams (4a, 4b) are folded by pivoting about a respective articulation (17) having a substantially vertical axis. The primary beams (4a, 4b) fold towards the front to reduce the transport width. According to an alternative, the primary beams (4a, 4b) fold towards the rear.

In the case of an agricultural soil-working machine, the work elements (3) are made by discs or teeth.

In an example embodiment which is not represented, the two primary beams (4a, 4b) can be arranged in an offset manner one with respect to the other, taking account of the direction of advance (A).

According to another variant embodiment of the invention which is not represented, the longitudinal bar (4) is constituted by at least three sections.

It is readily evident that the invention is not limited to the embodiments described above and represented in the attached drawings. Modifications remain possible, in particular with regard to the constitution or the number of the various elements or by substitution of technical equivalents without, however, departing from the scope of protection as is defined by the following claims.

The invention claimed is:

1. An agricultural machine for working soil or for sowing seeds, comprising:
    a trailed chassis and work elements distributed on a longitudinal bar in plural sections, the longitudinal bar including at least two primary beams extending substantially transversely to a direction of advance; and
    a secondary beam connected to each primary beam by two connection devices that are independent of one another such that, in a first position, a first end of the secondary beam is closer to the primary beam and, in a second position, a second end of the secondary beam is closer to the primary beam,
    the secondary beams supporting the work elements, and each secondary beam resting on the soil by two support wheels and being configured to move freely to follow a profile of the terrain.

2. An agricultural machine according to claim 1, wherein a first connection device of the two connection devices is arranged closer to a first end than a second end of one of the secondary beams and a second connection device of the two connection devices is arranged closer to a second end than a first end of the one of the secondary beams.

3. An agricultural machine according to claim 1, wherein at least one support wheel is associated with each connection device.

4. An agricultural machine according to claim 1, wherein a first support wheel of the two support wheels is arranged between a first end of one of the secondary beams and one of the connection devices that is closest to the first end, and a second support wheel of the two support wheels is arranged between a second end of the one of the secondary beams and one of the connection devices that is closest to the second end.

5. An agricultural machine according to claim 1, wherein each of the two connection devices is floating during operation of the machine.

6. An agricultural machine according to claim 1, wherein a center of rotation of each secondary beam extends between the two connection devices that connect the secondary beam to the primary beam.

7. An agricultural machine according to claim 1, wherein each connection device includes four articulations, one of which is a pivot articulation with an axis which is horizontal and perpendicular to the direction of advance.

8. An agricultural machine according to claim 1, wherein each connection device includes at least one lower connecting-rod and at least one upper connecting-rod.

9. An agricultural machine according to claim 1, wherein each connection device includes a stop system.

10. An agricultural machine according to claim 1, wherein the support wheels are substantially aligned with the work elements according to a top view.

* * * * *